Figure 1:
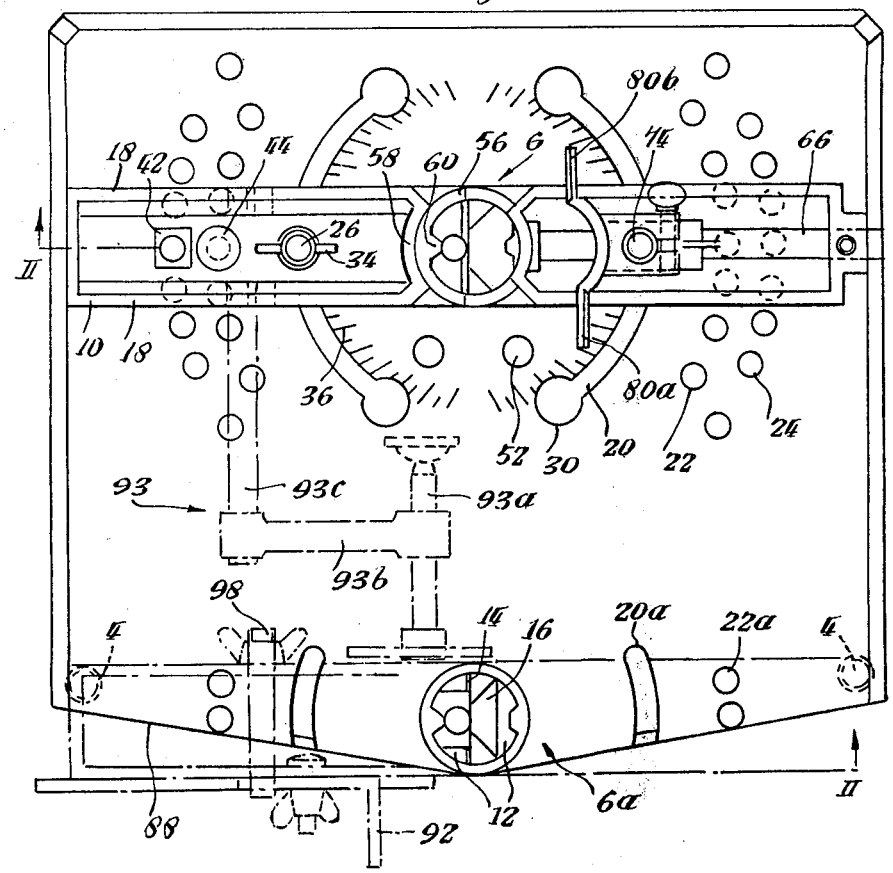

United States Patent [19]
Wynn

[11] 3,918,340
[45] Nov. 11, 1975

[54] WORKPIECE LOCATION MEANS

[76] Inventor: Gordon Williams Wynn, 308, Northridge Way, Hemel Hempstead, Hertfordshire, England

[22] Filed: May 24, 1972

[21] Appl. No.: 256,446

[30] Foreign Application Priority Data
May 25, 1971 United Kingdom............... 16955/71

[52] U.S. Cl. ...................... 83/765; 83/766; 83/767
[51] Int. Cl.² .......................................... B27G 5/02
[58] Field of Search ............ 83/761, 762, 763, 764, 83/765, 766, 767

[56] References Cited
UNITED STATES PATENTS

| | | |
|---|---|---|
| 128,486 | 7/1872 | Henkle.................................. 83/767 |
| 369,770 | 9/1887 | Brewster............................... 83/763 |
| 512,561 | 1/1894 | Lumsden .............................. 83/765 |
| 831,940 | 9/1906 | Dorn..................................... 83/766 |
| 1,013,010 | 12/1911 | Graham ................................ 83/762 |
| 1,393,126 | 10/1921 | Hinds.................................... 83/760 |

Primary Examiner—Donald R. Schran

[57] ABSTRACT

Location apparatus for making saw cuts in workpieces has a workpiece side face location device pivotable on a carrier that supports saw guides, so that the obliquity of the saw cut can be varied without shifting the position of the cutting plane defined by the saw guides. The location device is also provided with setting means that locate an elongate workpiece in a manner permitting longitudinal or near-longitudinal cuts to be made in it in a predetermined manner, and with means that locate a transverse face of the workpiece at an adjustable distance from the cutting plane.

17 Claims, 9 Drawing Figures

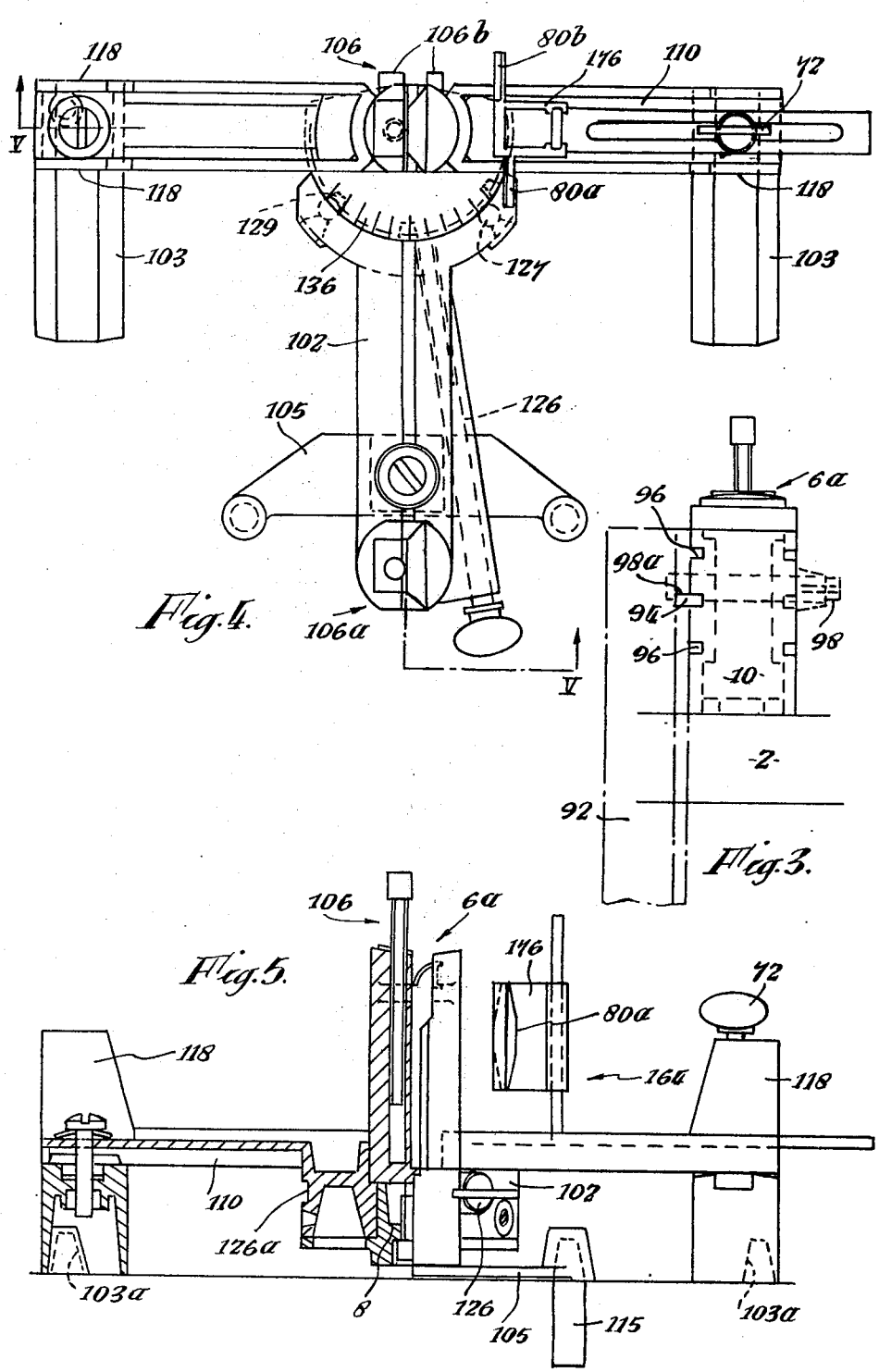

WORKPIECE LOCATION MEANS

This invention relates to apparatus for the location of a workpiece and for the guidance of a tool in order to be able to perform such operations as sawing upon the workpiece.

Jigs or guides are sometimes employed to assist the sawing of an elongate workpiece at an oblique angle to the longitudinal axis of the workpiece: Such apparatus is known in which the saw blade slidably engages a location device which is itself angularly adjustable to set the obliquity of the saw cut. Such apparatus, however, requires the operator to change his position in dependence upon the angle that is to be cut if the base of the apparatus is to be held firm, as by a bench vice. Moreover, the location device engages the rear or upper portion of the saw blade, which is often inconvenient.

According to the invention, there is provided cutting guide apparatus comprising a carrier on which is mounted location means against which a face of a workpiece can be registered, and means providing a guide plane for a saw blade, said workpiece location means being rotatable relative to the carrier to permit variation of the angular setting of said workpiece face to the saw guide plane. To assist accurate adjustment in a simple manner, the workpiece location means may have elements for the setting of said workpiece side face at predetermined angular orientations to the saw guide plane.

For strength and for adaptability of the apparatus to additional tasks, said workpiece location means preferably have a hollow central portion through which a saw guide device of said guide means projects. There may also be provided a further saw guide device co-planar with said first device and secured to the base member outside the path of rotation of the workpiece location means.

Thus, an advantageous feature of apparatus according to the invention is the fact that means may be provided to assist the workpiece to be set at an adjustable distance from the saw guide plane. Such longitudinal location means may be mounted on said workpiece location means, the side face location means and the longitudinal location means conveniently being disposed on opposite sides of the saw guide plane if it is intended to employ the apparatus to make transverse cuts in elongate workpieces.

Apparatus according to the invention can also be arranged to provide a means of location permitting the workpiece to depend below the carrier member, advantageously such that the workpiece longitudinal axis can be adjusted angularly about an axis transverse to the axis of rotation of the first location means, for example to make saw cuts parallel or at small angles to the workpiece longitudinal axis.

Figure 2:
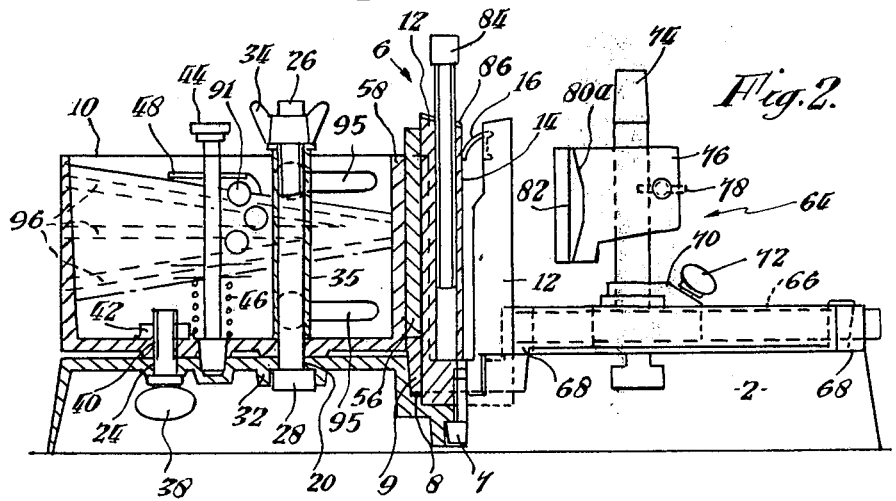
Figure 6:
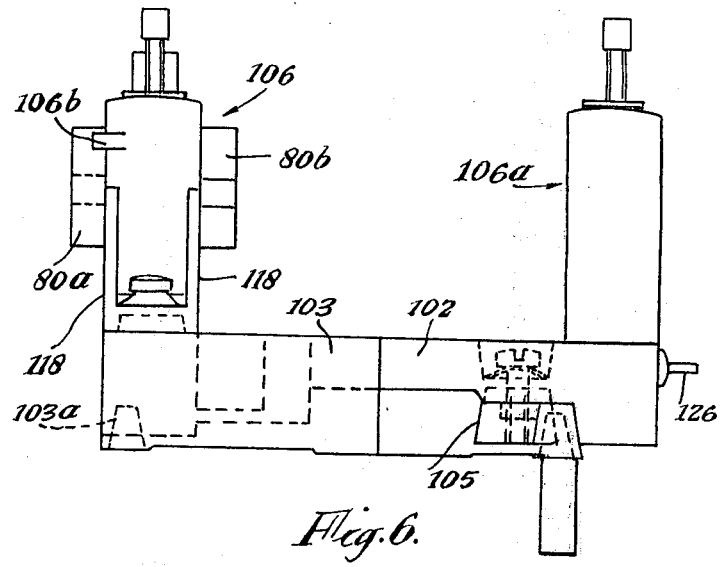
Figure 9:
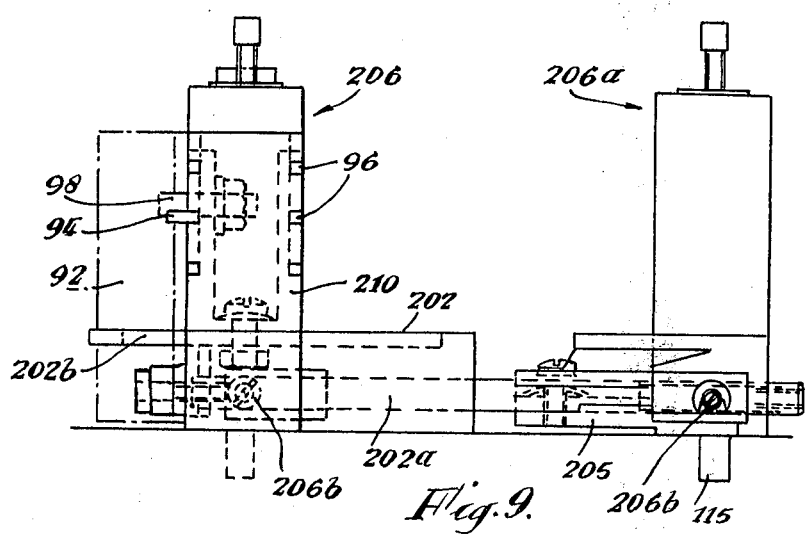
Figure 7:
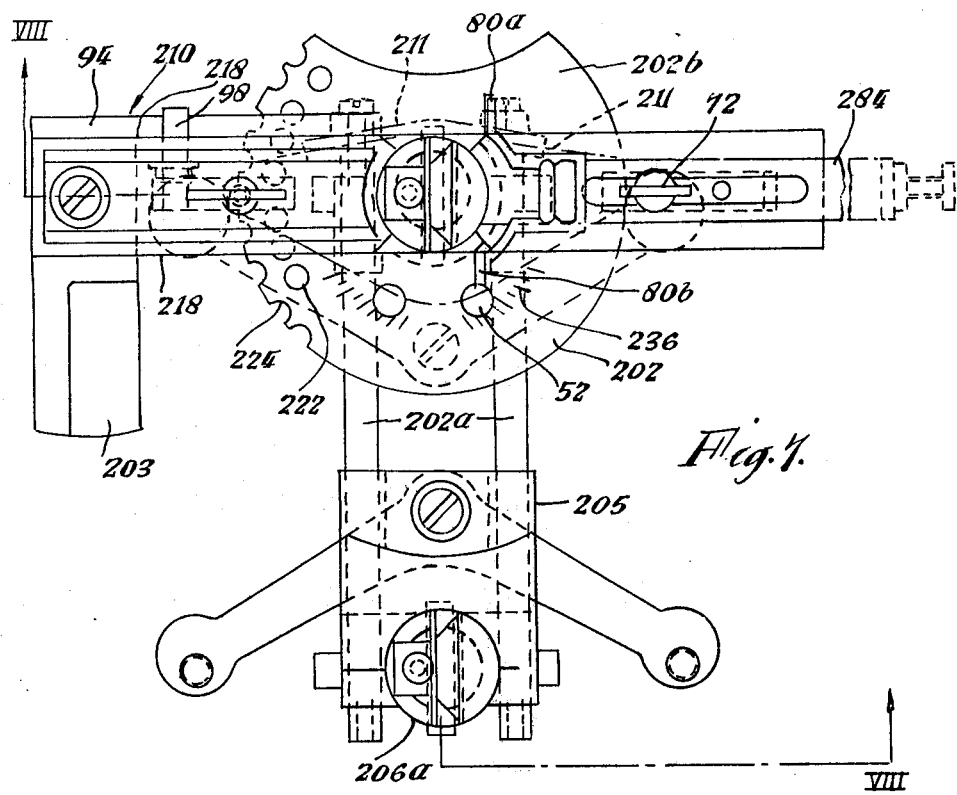
Figure 8:
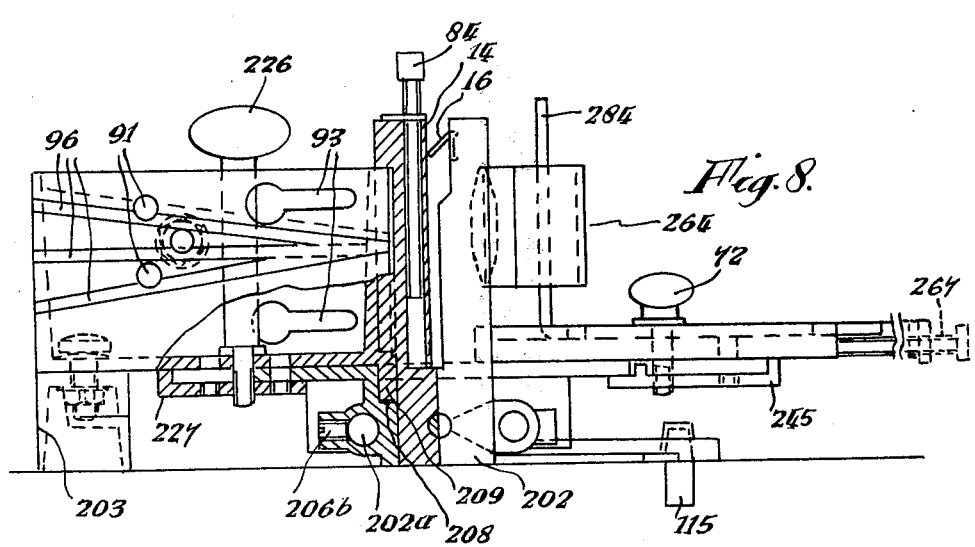

Examples of the invention will be more particularly described with reference to the accompanying drawings, wherein:

FIGS. 1 to 3 illustrate a first embodiment of the invention, FIG. 1 being a plan view, FIG. 2 being a front view partly in section on the line II—II in FIG. 1, and FIG. 3 being a partial side view of the apparatus, FIGS. 4 to 6 illustrate a second embodiment of the invention, FIG. 4 being a plan view, FIG. 5 being a front view partly in section on the line V—V in FIG. 4, and FIG. 6 being a side view of the apparatus, and FIGS. 7 to 9 are similar views of a third embodiment of the invention, FIG. 8 being partly in section on the line VIII—VIII in FIG. 7.

Referring first to FIGS. 1 to 3 the apparatus comprises a base or carrier 2, e.g. formed as a casting, having a pair of bores 4 by means of which it can be secured to a work surface by dowel pins in the manner of a bench hook. Respective saw guides 6, 6a in the form of vertical columns are secured by screws 7 to the base 2 to project upwards therefrom, the rear guide column being located at the centre of a socket 8 in the base to form therewith a tubular recess. A tubular spigot 9 of a cross-member 10 can be slid over the guide column 6 to seat in the recess so that the cross-member is then rotatably mounted on the base.

The saw guides define a guide plane for a saw blade and each comprises a pair of vertical elements 12, one of which is faced with a wear-resistant plate 14 against which a side face of the saw blade can be located, the plates 14 of the two guide being co-planar. In the other element of each guide there is a pair of grooves holding spaced lips of a resilient member 16, e.g. of nylon, that has a downwardly inclined strip projecting towards the associated plate 14 to urge the saw blade against the location face formed by the plate 14. Both the plates 14 and the members 16 are replaceably secured in the saw guide elements 12.

In a radially outer region of the cross-member 10 there are parallel side faces 18 that form alternative locations against which the workpiece can be held. For transverse saw-cuts in an elongate or strip workpiece, a side face of the workpiece will be held against the forward one of the faces 18. In this example, and in the further examples described below these locating side faces and/or the surfaces against which the underside of the workpiece can bear, have an anti-slip finish. Additionally, clamping means can be provided to hold the workpiece more securely against its locating side face.

At diametrically opposed regions on opposite sides of the saw guide plane there are a pair of arcuate slots 20 and two pairs of groups of apertures or recesses 22, 24 on pitch circles concentric with the slots, the centres of the circles being close to the saw guide plane and coincident with the axis of the socket 8. The cross-member 10 carries a bolt 26 having a square head 28 that can be inserted through enlarged end openings 30 of a slot 20 but when moved to intermediate positions along the slot by pivoting of the cross-member, the head 28 engages side walls 32 on the underside of the base to hold the bolt against rotation. By screwing down a wing nut 34 on the bolt against a compression tube 35, the cross-member can be locked in a desired pivoted position. To assist this, a protractor scale 36 is provided on the base to achievve a given angular setting by registration of the front face of the cross-member 10 with the appropriate graduation.

The apertures 22, 24 provide alternative or additional means of angular location that allows commonly required angular settings, such as 45°, 30°, 22½°, to be obtained simply. FIG. 2 shows two alternative means of engaging these apertures which are, indeed, substitutable by or for the bolt locking arrangement shown for the slots 20, although an apparatus would normally employ a single form of engagement means for the apertures 22, 24. Illustrated for the outer apertures 24 is a thumb-screw 38 that can be inserted from below through a chosen aperture to engage a bore 40 in the cross-member 10 that may be threaded or that may have adjacent means for holding a captive nut 42 non-rotatably. For the inner row of apertures 22, a plunger 44 is slidably mounted on the cross-member 10 to be urged downwards by a spring 46 into an aligned aperture. The plunger may be lifted free and rotated to bring a pin 48 into bearing engagement with the top edge of the cross-member, so holding the plunger retracted.

At the 45° setting, two dowel pins (not shown) can be inserted in either of a pair of further apertures 52 to provide a location point for an end face of a workpiece such that a mitre can be cut at the very end of the workpiece, so facilitating, for example, the formation of a halved or lapped right-angled mitre joint.

The symmetrical arrangement on opposite sides of the saw guide plane of the slots 20, groups of apertures or recesses 22, 24 and dowel holes 52 allows the apparatus to be used by a right-handed or left-handed operator since the cross-member 10 can be pivoted to bring its side faces 18 to either side of the saw guide plane.

Because the forward face of the saw guide column 6 lies behind the front one of the faces 18 of the cross-member, it will not itself be able to provide a backing support for a workpiece. It is, however, desirable to provide such a support close to the saw guide plane and there is therefore provided a generally arcuate section packing member 56 that can be slid into the gap between the arcuate flange 58 of the cross-member and the guide column to provide such a support. A keying projection 60 prevents rotation of the member 56 with the cross-member.

For a number of operations that require location of the workpiece in the direction parallel to the faces 18, there is also a gauging device 64 mounted on the opposite end of the cross-member 10 to the locating faces 18. This comprises a round section mounting bar 66 parallel to the faces 18 running between end flanges 68 and carrying a cylindrical sleeve 70 that is slidable along and rotatable on the bar and that can be fixed on the bar by a thumb-screw 72. A circular section post 74 projects from the sleeve perpendicular to the bar 66 and a selector head 76 slidable on the post 74 can be secured in position by a thumb-screw 78. The selector head is provided with opposed blades 80a, 80b, each of double-wedge form, the two blades having oppositely facing tapered surfaces and having vertical surfaces 82 in a common plane.

Among the uses of the gauging device is the setting of a workpiece to a predetermined position axially (i.e., parallel to the faces 18) to cut a recess in it, e.g. for a halved joint. The alternative blades 80a, 80b of the selector head are provided for the formation of such a recess either intermediate the length of the wrkpiece, when the width of the recess will include two saw kerfs, or, in contrast to this closed form of recess, an open recess at the end of a workpiece, when the recess width will include only one saw kerf.

For an open recess or tongue in the workpiece intended to go the width of a co-operating joint member, that member is placed between the rear saw guide 6 and the post 74 which is slid along the bar 66 and clamped by the thumbscrew 72 when said co-operating member is lightly gripped between the guide 6 and the post. If the selector head is placed in position on the post 74 with the blade 80a to the front, when the end face of the workpiece is brought into abutment with that blade, a saw cut to be made in the workpiece at the saw guide plane will form the end face of an open recess having the gauged width of the co-operating member.

For a closed recess, after one of the recess end faces has been cut in the workpiece with the setting of the post 74 gauged as before from the co-operating joint member the blade 80b of the selector head is used located at the front when the head is placed on the post. If the workpiece is then positioned to allow the block to be slid into the first saw cut, the workpiece will be in place for the second end face of the recess to be sawn. In both instances, with the required saw cut or cuts completed, the remaining waste material can be removed to complete the recess.

Because of the rotatability of the selector head 76 on the post 74, it is also possible to employ the gauging device for the preparation of dovetail joints. For example, after securing the cross-member 10 at the appropriate angle to the saw guide plane and with the selector head blades parallel to the saw guide plane, a series of evenly spaced saw cuts can be made in a workpiece at a predetermined oblique angle to the workpiece axis, the selector head position along the bar 66 determining the spacing of the cuts. The angular setting of the cross-member is then reversed for the cutting of the other side of each dovetail slot and, with the selector head reset to the required oblique angle to seat in the existing cuts and with its position along the bar 66 suitably adjusted, this second series of cuts can be made with the certainty that the width of the resulting slots is uniform.

The cuts made in the manner described in the preceding paragraph run obliquely as seen in a plane parallel to the workpiece botom face. To make angled cuts that run obliquely as seen in a plane parallel to the side face of the workpiece located against one of the faces 18, it is possible to place a packing wedge under the workpiece, between the cross-member 10 and the workpiece.

In order to control the depth of a saw cut in a workpiece one or both guide columns 6, 6a can be provided with adjustable depth stops. FIG. 2 shows such a stop in the form of a screw 84 extending into a hole at the top of a column and located at the required height by a plate 86 which is threaded onto the screw and which rests on top of the column. The head of the screw is of a size that allows it to engage with the back or spine of a tenon saw as the saw cut proceeds, so preventing further descent of the saw.

The apparatus illustrated is also capable of receiving a workpiece so that it projects below the base, e.g. for making longitudinal or near longitudinal saw cuts in a workpiece, or for saw cuts oblique to both the longitudinal direction and a plane perpendicular thereto.

For this purpose, the cross-member 10 is removed from its illustrated position and is slid onto the forward saw guide 6a where its spigot 9 can seat in a socket 8a surrounding that saw guide. The cross-member now overlaps front edge 88 of the base 2 so that the forward one of the location faces of the member 10 can provide a location for a workpiece that is clamped to it to depend below the base 2. This arrangement can be used with the cross-member at a small oblique angle (to cut dovetail joints) because of the rearward inclination of the front edge 88, and the cross-member can be secured in its desired angular position by the bolt 26 engaging one or other of a pair of slots 20a which are formed analogously to the slots 20. Holes 22a provide an alternative means of engagement analogously to the holes 22.

A bearer 92 is provided for location of a side face of the workpiece. The bearer is in the form of an angle plate bolted to the cross-member 10, preferably by slotted engagements 95 that permit the angular orientation and distance of the bearer from the saw guide plane to be adjusted. In addition, means are provided for location of a top face of the workpiece, these comprising a strip 94 that is engageable alternatively into any of a group of mutually inclined slots 96 formed in both side faces 18 of the cross-member. The strip may be secured in position by a locking bolt 98 that has a segmental cutout 98a in which the strip is gripped. A main purpose of the alternative inclined locations for the strip may be the cutting of dovetail joints and the inclinations of the slots 96 can be chosen accordingly.

Apertures 91 for receiving the locking bolt 98 can alternatively be used to mount a clamp 93 that comprises a clamping foot 93a have a threaded connection with an arm 93b pivotable on post 93c engaging any of the apertures. This arrangement allows a workpiece to be held firmly against the cross-member, whether for transverse or longitudinal sawing operations.

The form of apparatus shown in FIGS. 4 to 6 is arranged to be collapsible for portability but has many of the features already described with reference to the first embodiment, these being indicated by the same reference numbers.

In this example, carrier 102 supports saw guide columns 106, 106a. A cross-member 110 has pairs of side faces 118 at both end regions and the saw guide column 106 now has a circular periphery that is tangential to the plane of the locating side faces 118. Because of the narrow form of the carrier 102, side bearers 103 are secured to opposite ends of the cross-member, their top surfaces lying co-planar with the top surface of the carrier between them for support of a workpiece. A front bearer 105 is secured to the forward region of the carrier, this last bearer now carrying the dowel pins 115 for location of the apparatus on a working surface. The mountings of the bearers permit them to be pivoted into line with their attaching members when the apparatus is collapsed.

The angular setting of the cross-member 110 is indicated by a protractor scale 136, it being secured in a desired position by a locking screw 126 extending to the front of the apparatus and engaging in an arcuate slot 126a in the cross-member. Specific angular settings are still obtainable, however, by use of spring loaded balls 127 engaging in recesses 129 in the cross-member.

A gauging device 164 for location of the workpiece in a direction parallel to the flanges 118 does not have the rotational adjustability of the gauging device 64 but its selector head 176 functions similarly in other respects and therefore requires no additional explanation.

For making vertical or near vertical saw cuts in a workpiece that depends below the surface on which the apparatus rests, the apparatus must first be reversed so that the dowels engaging the front edge of the work surface are inserted in apertures 103a in the side bearers. The top face of the dependent workpiece can then be abutted against projections 106b on the rear saw guide.

In the further embodiment of the invention illustrated in FIGS. 7 to 9, parts already described are indicated by the same reference numbers. In this embodiment, a carrier 202 comprises a socket 208 in which rear saw guide 206 is seated and a removable forward extension 202a carrying the forward saw guide 206a. The saw guides here are generally similar to the guides of the previously described examples, but it will be noted that side location face 218 is tangential to the rear guide 206. A front bearer 205 slidable on the extension 202a supports the forward saw guide and also carries the dowel pins 115 for location of the apparatus on a working surface. The front bearer 205 is displaceable on the forward extension 202a of the carrier towards and away from the rear saw guide, and the extension 202a is itself removable from the carrier 202, clamping screws 206b being shown for securing the carrier and the front bearer to the extension 202a. As in the previous examples, this appratus too can be used by a left-handed operator, but to do this the extension 202a is removed from its illustrated position and reattached to project in the opposite direction from the carrier 202.

The cross-member 210 has a spigot 209 rotatably fitting the carrier socket 208 and a single side bearer 203 is secured to that end of the cross-member on which the locating side face 218 are provided. The L-form top surface of the side bearer 203 is co-planar with the top face of protractor scale 236 of the carrier and these provide jointly a bottom support face for a workpiece. As in the example of FIGS. 4 to 6, the cross-member 210 and bearer 203 can be pivoted to non-operative positions to collapse the apparatus.

The cross-member is able to pivot on the carrier in the manner already described and two series of apertures 222, 224 are provided in the region of the protractor scale, the outer series being formed in the edge of the carrier as open recesses. Fixing of the cross-member with the aid of the apertures can be achieved by means of respective clamps 227, 245 at opposite sides of the carrier 202. The clamp 227 is secured by threaded engagement with a thumb-screw 226 which can be inserted in an aperture of either of the series 222, 224. The clamp 245 is secured by screw 72 that also fixes the gauging device 264. The gauge bar 284 of the transverse gauging device 264 in this example is also provided with a setting screw 267 which facilitates the return of the bar to a given setting.

The provision in the example for sawing a dependent workpiece, e.g. to make a longitudinal or near longitudinal cut in the workpiece, are generally similar to the arrangement for this purpose illustrated and described in the embodiment of FIGS. 1 to 3, but the following differences may be noted.

Firstly, the carrier 202 is now composed of a main part which has the socket 208 but which has an arcuate bearer plate, on which the protractor scale 236 is marked, extending for only 160°. A second part 202b is detachably secured to the first part, e.g. by dowels (not shown) to give the plate the rearwardly projecting form illustrated so that suitable support can be provided for clamping the cross-member 210 at oblique angles. (The arcuate recess at the rear of the part 202b provides clearance for the folding in of the side bearer 203 when the apparatus is collapsed). For sawing a dependent workpiece, the part 202b is removed the carrier 202 then terminating at the faces 211 to allow the workpiece to be clamped to a side face of the cross-member, the obliquity of the faces 211 allowing the cross-member to be pivoted slightly to set the workpiece for the cutting of dovetail slots.

The apparatus is then used reversed, with the extension 202a projecting rearwardly. A bench stop is provided by reversing the legs of the bearer 205 from their illustrated position and sliding it along the extension 202a until it reaches an end position in which it projects under the cross-member, just short of the vertical clearance planes defined by the edges 211 of the main part of the member 202.

It will be appreciated that many modifications to the illustrated forms of apparatus may be made within the scope of the invention. For example, the gauging devices which have been described as having blades that engage the workpiece to locate it can alternatively be provided with sighting means allowing the workpiece to be located without being contacted by the gauging device. Also, many of the specific features described may be substituted in an embodiment other than the one in which they have been shown.

What I claim and desire to secure by Letters Patent is:

1. Cutting guide apparatus for making a saw cut in a workpiece and comprising, in combination, a carrier, workpiece location means, mounting means locating the workpiece location means on the carrier in an angularly adjustable manner, saw guide means comprising at least one saw guide member mounted on the carrier and projecting upwardly therefrom for providing a guide plane for a saw blade, said mounting means comprising a rotary bearing portion mounted with the workpiece location means for movement therewith and having a hollow central region within said bearing portion through which said saw guide member projects, said workpiece location means comprising a member offset to one side of the saw guide plane and defining a location plane against which a first face of the workpiece can be registered whereby to vary the angular position of the workpiece relative the saw guide plane in dependence upon the angular adjustment of the workpiece location means, said workpiece location means further comprising gauging means disposed on the opposide saide of said saw guide plane to said mamber, said gauging means being displaceable on hte workpiece location means towards and away from the saw guide plane to be secured at an adjustable setting for location of a second face of the workpiece at a desired distance from the saw guide plane.

2. Apparatus according to claim 1 wherein setting elements are provided co-operating with the workpiece location means to place said workpiece first face at predetermined angular orientations to the saw guide plane.

3. Apparatus according to claim 1 wherein at least one bearing element of said location means is displaceable to either side of the saw guide plane to provide such registration for the workpiece first face at said either side of the saw guide plane selectively.

4. Apparatus according to claim 1 wherein the workpiece location means comprises a side face defining a vertical location plane intersecting the saw guide plane over at least a portion of its length disposed in a planar region spaced from the carrier to provide a location for a side face of a workpiece depending therefrom below the carrier.

5. Apparatus according to claim 4 wherein gauging means are provided to locate a face of the workpiece at an adjustable distance from the saw guide plane, said means comprising a member displaceably secured to said side face for location of a face of said dependent workpiece.

6. Apparatus according to claim 1 wherein said saw guide means is defined by spaced first and second saw guide members mounted on the carrier by means for permitting adjustment of the spacing of said members.

7. Apparatus according to claim 1 wherein said gauging means comprises a member that is angularly adjustable about an axis lying on a plane parallel the saw guide plane.

8. Cutting guide apparatus for making a saw cut in a workpiece and comprising, in combination, a carrier, saw guide means on the carrier providing a guide plane for a saw blade, workpiece location means, mounting means locating the workpiece location means on the carrier to be angularly adjustable relative the carrier about a first axis in or parallel the saw guide plane, said workpiece location means comprising a main location member against which a face of the workpiece can be registered whereby to vary the angular position of the workpiece relative the saw guide plane about said first axis, supplementary location means disposed on said main location member and providing multiple locations for a further face of the workpiece, said multiple locations being at different angles to a second axis normal said first axis, the workpiece location means further comprising gauging means displaceably mounted on said workpiece location means to be movable towards and away from the saw guide plane to be secured at an adjustable setting for location of a face of the workpiece at a desired distance from the saw guide plane, said main location member and said gauging means being arranged on opposite sides of the axis of angular adjustment of the workpiece location means and the workpiece location means being disposable in a position in which said main location member defines a vertical face clear of the carrier whereby a workpiece dependent below the carrier can be positioned by said main member, supplementary location means and gauging means jointly.

9. Apparatus according to claim 8 wherein said supplementary location means is defined by a plurality of apertures provided in said vertical face and an abutment element for the top face of such dependent workpiece, said abutment element being selectively positioned and held in one of said apertures and being located thereby in a predetermined orientation.

10. Apparatus according to claim 8 wherein a bearing portion is mounted with said workpiece location means and engages with the carrier in a rotatable manner for said angular adjustment of said location means, a hollow central region being formed in said bearing portion and a saw guide member of said saw guide means projecting through said region.

11. Cutting guide apparatus for making a saw cut in a workpiece and comprising, in combination, a carrier, workpiece location means and rotary bearing means by which the workpiece location means are mounted on the carrier, saw guide means on said carrier providing a guide plane for a saw blade, said bearing means permitting rotation of the workpiece location means on the carrier about an axis lying in or adjacently parallel the saw guide plane, the saw guide means comprising an elongate member projecting upwardly from a radially inner region of said bearing means.

12. Apparatus according to claim 11 wherein gauging means are provided to locate a face of the workpiece at an adjustable distance from the saw guide plane.

13. Apparatus according to claim 11 wherein a planar element on said workpiece location means provides a location for a side face of the workpiece and said element lies in a plane tangential to said elongate member.

14. Apparatus according to claim 13 wherein respective parallel planar elements are provided on said workpiece location means to be tangential to diametrically opposite regions of said elongate member.

15. Apparatus according to claim 11 wherein said carrier defines a support plane, said saw guide means comprises a generally cylindrical saw guide column fixedly extending generally perpendicularly upwardly therefrom having a gap extending therethrough defined on one side by a surface defining said saw guide plane, and said member comprises a concave recess at an end thereof adjacent said guide column having an arcuate surface of a radius similar to the radius of said guide column closely fitted thereagainst, enabling angular movement of said member about a center on or adjacently parallel said saw guide plane.

16. Apparatus according to claim 15 wherein said carrier is provided with a generally annular recess extending into said support surface generally co-axially around said saw guide column and said end of said member comprises a mating spigot guidedly receivable within said recess retaining said one end of said member adjacent said saw guide column while enabling rotational movement thereabout.

17. Apparatus according to claim 16 wherein said saw guide column further comprises a generally cylindrical packing member, said location plane of said workpiece location member being tangential thereto.

* * * * *